United States Patent [19]

Curetti et al.

[11] 4,243,620
[45] Jan. 6, 1981

[54] METHOD OF MANUFACTURING AN OBJECT IN PLASTICS MATERIAL AND OBJECT OBTAINED THEREBY

[75] Inventors: Ennio G. Curetti, Grand-Lancy; André M. Collombin, Avully, both of Switzerland

[73] Assignee: Motosacoche S.A., Carouge, Switzerland

[21] Appl. No.: 923,084

[22] Filed: Jul. 7, 1978

Related U.S. Application Data

[63] Continuation of Ser. No. 692,508, Jun. 3, 1976, abandoned.

[30] Foreign Application Priority Data

Jun. 13, 1975 [CH] Switzerland ............ 7666/75

[51] Int. Cl.$^3$ .............. B29C 17/07; B29D 23/02; B29F 1/10
[52] U.S. Cl. .................. 264/45.1; 264/46.4; 264/513; 264/516; 264/532; 264/537; 264/255; 264/279; 264/312; 264/328.12; 425/533; 425/577
[58] Field of Search .............. 264/97, 98, 328, 329, 264/512, 513, 515, 523, 537–539, 45.1, 46.4, 255, 275, 279, 312, 516, 532; 425/533, 577, 468, 523; 249/63; 164/113, 136

[56] References Cited

U.S. PATENT DOCUMENTS

| 3,025,567 | 3/1962 | Sherman | 264/328 |
| 3,186,600 | 6/1965 | Guignard | 264/328 X |
| 3,305,892 | 2/1967 | Heider | 264/97 X |
| 3,511,845 | 5/1970 | Scalora | 264/294 |
| 3,759,315 | 9/1973 | Smart | 164/136 X |
| 3,778,211 | 12/1973 | Moen et al. | 425/245 R |
| 3,906,066 | 9/1975 | Barrie | 264/328 X |
| 3,947,176 | 3/1976 | Rainville | 264/97 X |
| 4,005,164 | 1/1977 | Procter | 264/97 |
| 4,012,386 | 3/1977 | Davis | 264/325 X |

FOREIGN PATENT DOCUMENTS

| 1362133 | 7/1974 | United Kingdom | 264/97 |
| 1390912 | 4/1975 | United Kingdom | 425/567 |

Primary Examiner—Jan H. Silbaugh
Attorney, Agent, or Firm—Young & Thompson

[57] ABSTRACT

The present invention is concerning a manufacturing process of an object made of plastic material in a mould comprising especially a die and a punch, this process being particularly interesting in that the obtained preforms may be formed by every known method, including thermoforming, blowing, etc. The process according to the invention is characterized in that a quantity of plastics material is introduced into the cavity of the mould, in that the flow of the material is controlled while it is being introduced into the mould cavity, by displacing at least part of the punch relatively to the die, in that the punch is subjected to a restraining action while the material is being introduced, and in that the cavity is closed and the plastics material contained therein is then compressed by displacing at least part of the punch in relation to the die.

11 Claims, 20 Drawing Figures

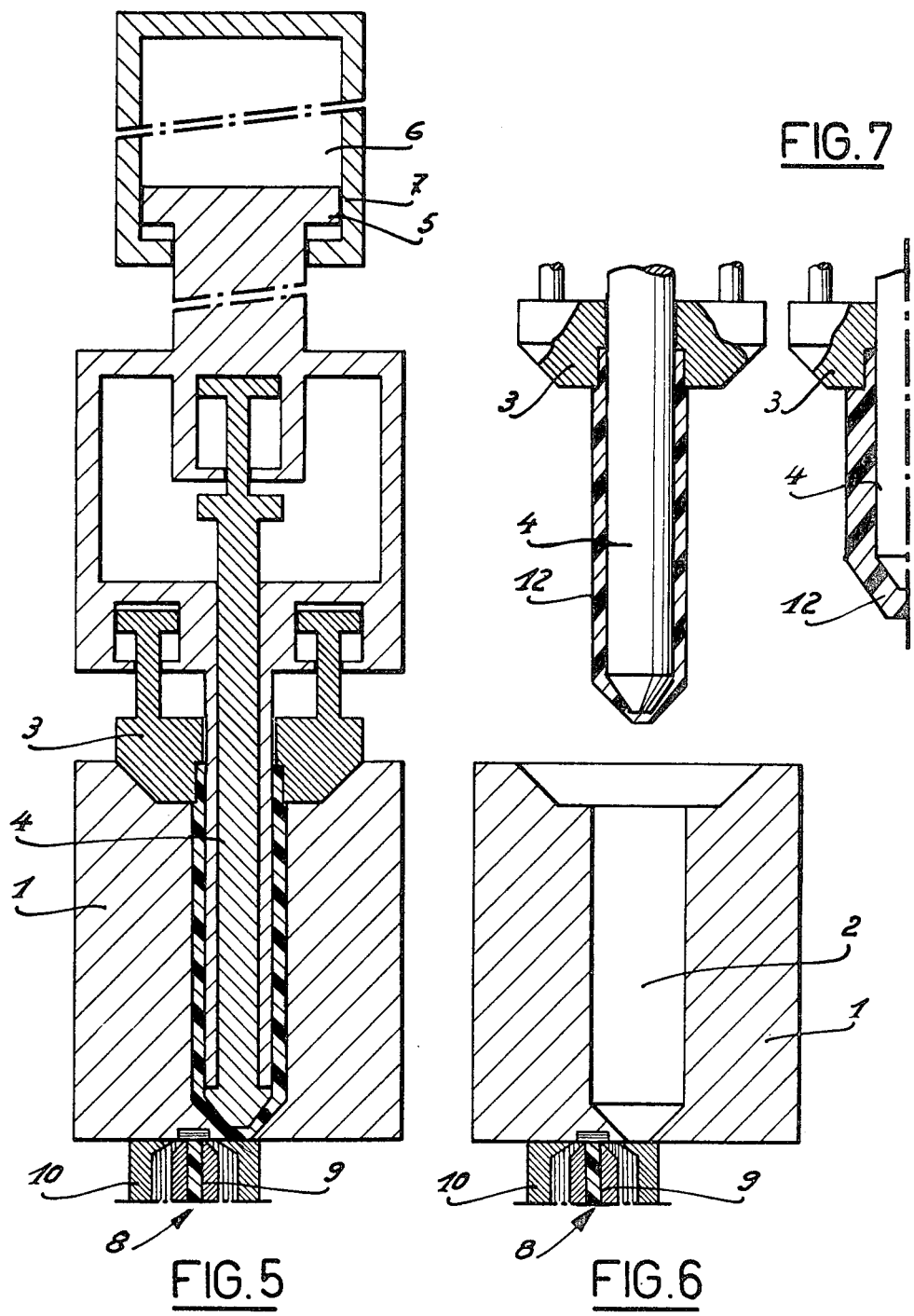

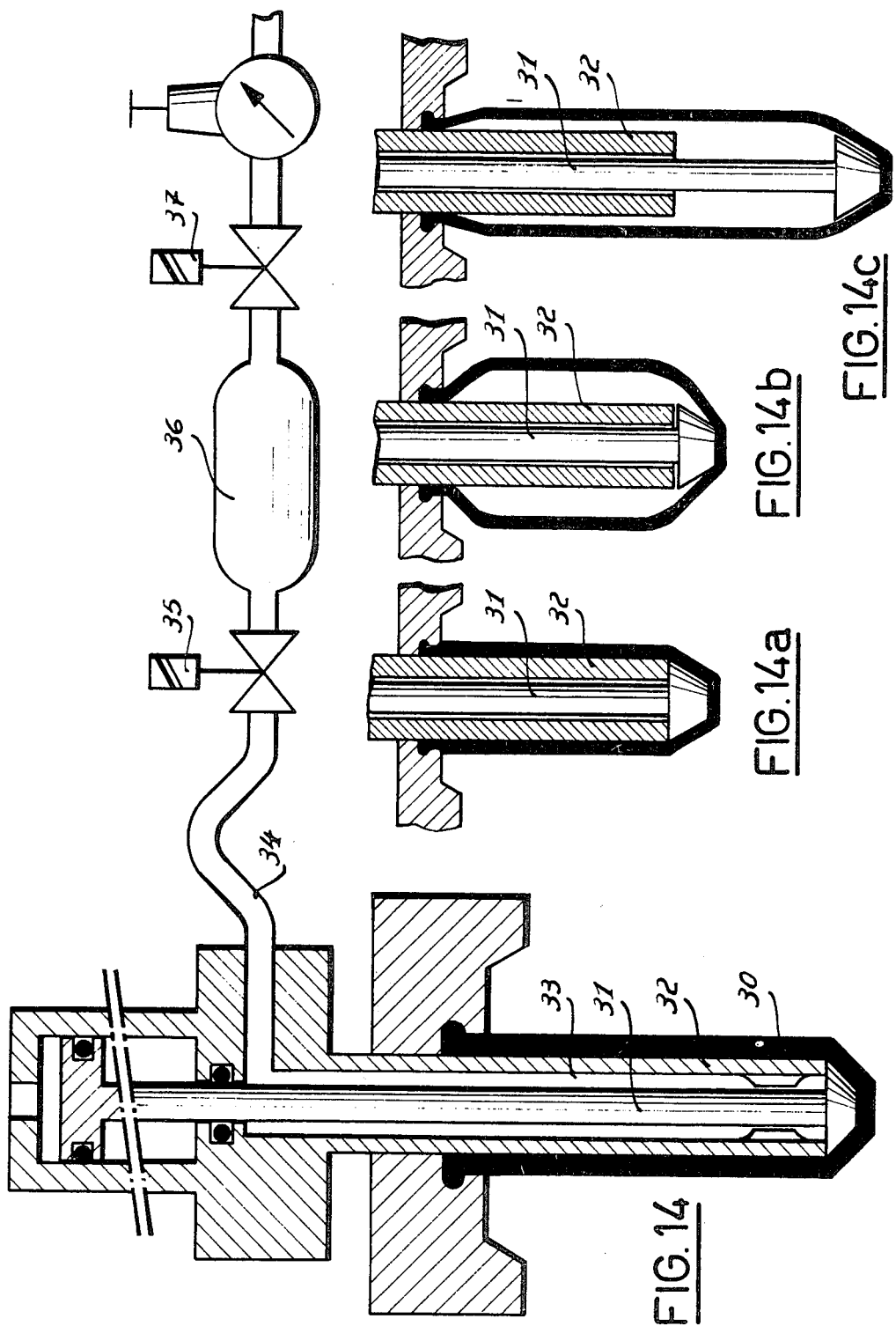

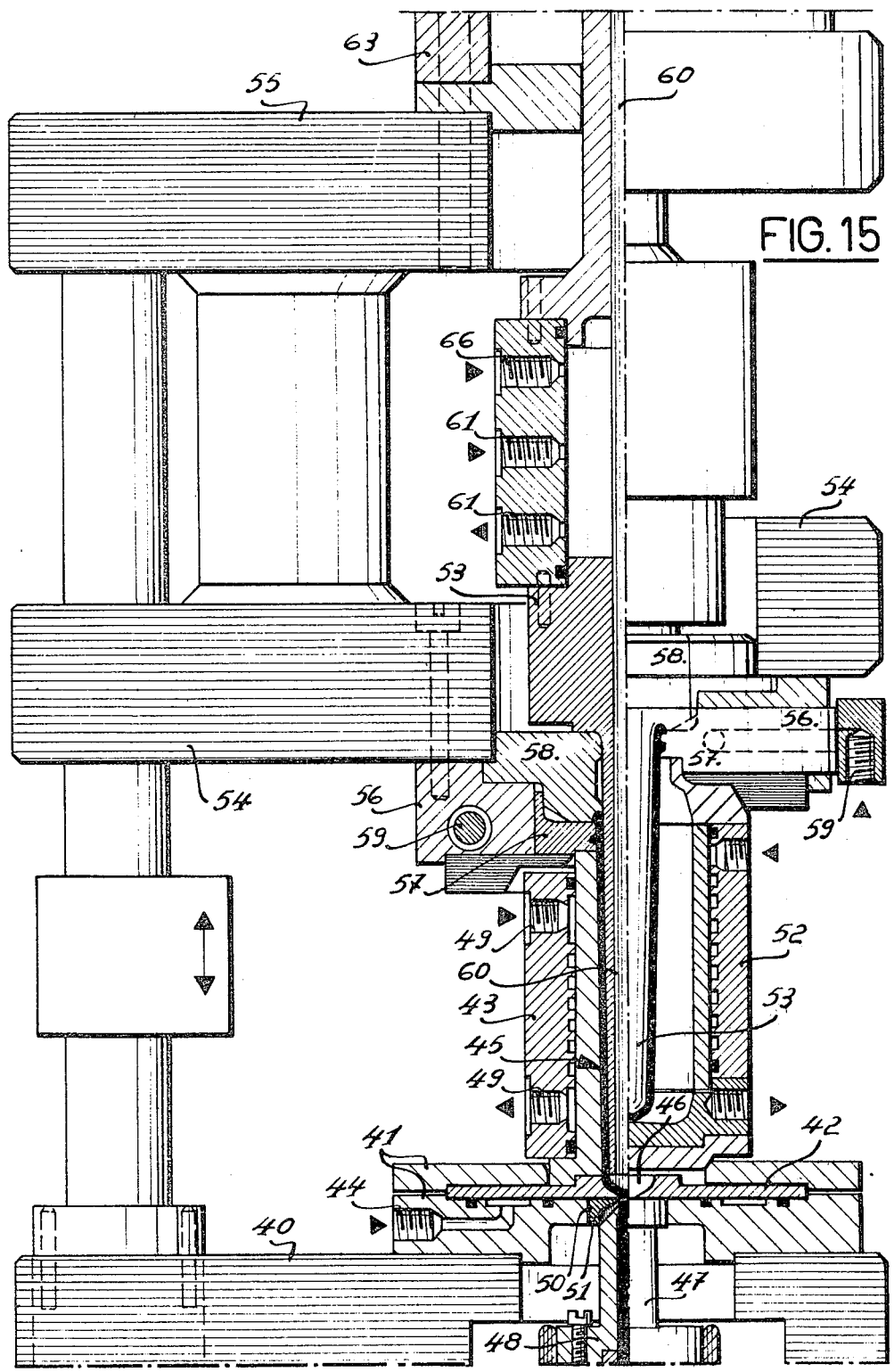

METHOD OF MANUFACTURING AN OBJECT IN PLASTICS MATERIAL AND OBJECT OBTAINED THEREBY

This is a continuation of application Ser. No. 692,508, filed June 3, 1976, now abandoned.

Various methods are known and used for producing objects in plastics materials, particularly hollow bodies, but all of these methods have certain limitations which the method herein proposed attempts to overcome.

The most widely used method is blow-extrusion.

This method makes use of a tube extruded in a press through a die; the tube hangs down under its own weight and is then introduced into a mould where the tube is expanded against the walls of the mould and is welded up at its lower end. The burrs are then trimmed off around the neck and base.

Limitations are imposed upon this method by the difficulties in controlling a blank or tube, hanging from the die without support and subjected to the effect of ambient temperature and of air currents, the impossibility, with certain plastics materials of obtaining qualities (e.g. viscosity and cohesion of the melted material) enabling a blank which does not tear under its own weight to be obtained, the need for complicated means for adjusting thicknesses of the walls at various places, and, in particular, the creation of waste in the order of 20 to 50% depending upon the shape of the bottle.

The production of hollow bodies having a composite wall by this method has hitherto failed because of the impossibility of effecting satisfactory and separate bonding of each layer of material used.

Hot shaping is a method that has been considerably more widely used in recent years, but it is generally limited to the production of hollow bodies having no reverse taper, such as cups.

It requires expensive plant, if it is borne in mind that a production line for providing sheet material is needed if it is to be possible to recover waste which may be as high as 50%.

It has been possible to produce multi-layer products by this method, but the multi-layer sheets require very costly co-extrusion equipment, and the multi-layer waste cannot be recovered if the layers have been bonded together by chemical means.

Injection-moulding is at present used for producing hollow bodies having no reverse taper; this method results in products having considerable weight, the thickness of the walls being determined by the dimensions of the spaces required for enabling the material to flow.

Blow injection-moulding is a method that has been developed to combine the features of injection-moulding (which provides a blank of generally cylindrical or conical form with a closed base supported by a core) with those of blow-extrusion (inflation of this blank in a blow-mould) carried out in a following stage.

Nevertheless, this promising method suffers from the following disadvantages:

very high cost of machines and tools in view of the complexity of the system and the precision required, difficulty in ensuring concentricity of the core and distribution of the material in the case of hollow bodies having narrow necks, in this case, the very high injection pressures tend to cause displacement of the core, and therefore uneven wall-thickness of the blank, and difficulty in the control of heat which is essential for obtaining a blank of suitable quality for the blowing operation which requires very hot portions (side portions) which are very close to very cold portions (bottom and neck of the bottle).

In particular, since injection-moulding of the blank is carried out at high pressure (600 to 1200 kg/cm$^2$), the material tends to pass in threads through the capillary nozzles necessary for enabling the blank to be separated from the plasticizer.

These threads which pass into the mould along different paths will become lodged at different points in the blank, and the different thermal history that they have undergone creates uneven internal stresses in the blank which will also be present in the finished bottle.

Many other existing methods might also be mentioned. However a method of manufacturing a blank, that is suitable for processing by various shaping methods, has not yet been developed.

Hitherto it has been necessary in practice to shape the blank in dependence upon the method (drawing, blowing, hotshaping etc.) used for obtaining the required finished article of plastics material.

The present method is aimed at avoiding the drawbacks of the above-mentioned methods and at providing a blank which can be converted to its final form by any of the existing shaping processes.

This method of manufacturing a blank in plastics material is characterized in that a quantity of plastics material is introduced into the cavity of the mould, in that the flow of the material is controlled while it is being introduced into the mould cavity, by displacing at least part of the punch relatively to the die, in that the punch is subjected to a restraining action while the material is being introduced, and in that the cavity is sealed and the plastics material contained therein is then compressed by displacing at least part of the punch in relation to the die.

The apparatus for carrying out this method is characterized in that it comprises a mould which has a die, an orifice for introducing the material, and a punch, of which at least a part is axially displaceable in relation to this die, and in that the punch is subjected to a restraining action which controls the flow of the plastics material entering the mould cavity, particularly to lamination of the material.

The annexed drawings illustrate diagrammatically and by way of example a form of construction of apparatus used for carrying out the method of manufacture in accordance with the present invention, as well as some modified constructions.

FIGS. 1 to 6 illustrate different stages in the method.

FIG. 7 illustrates an optional additional stage.

FIGS. 14 to 14c show symmatically a variant of the method according to the invention.

Figure 15:
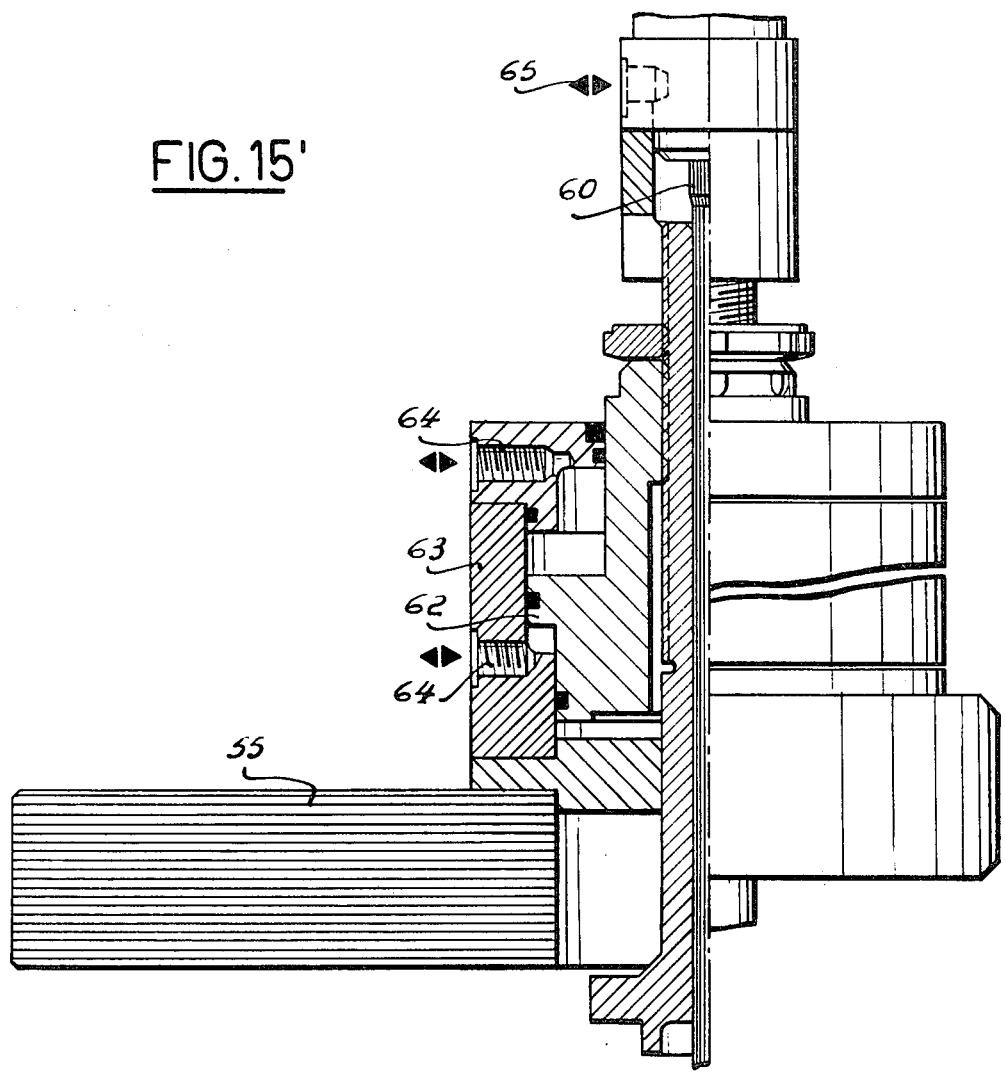

FIGS. 15, 15' show an embodiment of an installation to carry out the method according to the invention.

Figure 16:
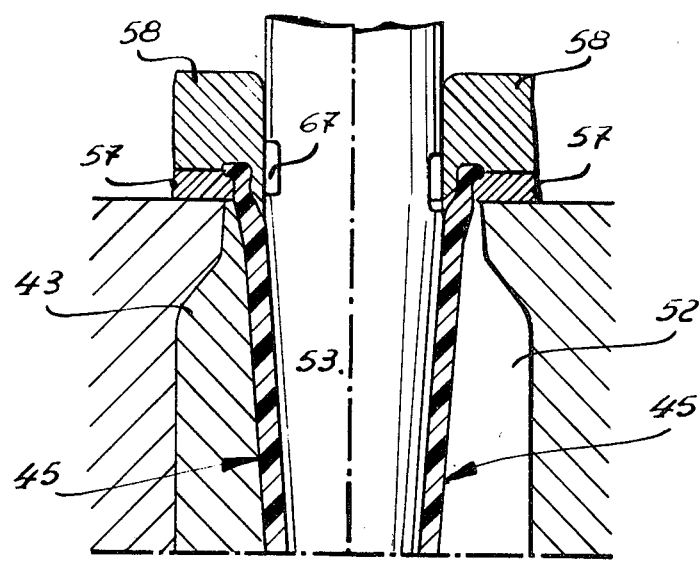

FIG. 16 is a partial crossection showing a variant of the punch of the installation.

To produce an object and, in particular, a blank that can be subsequently shaped by any one of various known processes, such as hot shaping, blow-moulding, vacuum-moulding, mechanical and/or pneumatic drawing or other combined methods, it is necessary for the material of which the blank is made to be as uniform as possible. It is not enough for the blank to be symmetrical; it is also necessary for the material of which the blank is made to be free from internal stresses, or for the unavoidable residual stresses to be limited and, for example, distributed symmetrically.

The annexed drawings illustrate very diagrammatically a form of construction of apparatus for carrying out the present method which will be described stage by stage by reference to these drawings.

The apparatus includes a mould comprising a die 1, the temperature of which can be controlled; the die has a cavity 2, with walls of a shape that correspond to the outside dimensions of a finished blank. The upper end of this die is closed by a sliding end-piece 3. The mould also comprises a punch 4 which extends longitudinally through the cavity 2 and is connected to the end-piece 3. In the example illustrated, this punch 4 is constituted by two parts, one of which slides within the other, which arrangement enables the blank to be subsequently inflated.

In the example illustrated, the entire punch is displaceable, against a restraining action, in relation to the die; however, in modified arrangements, only one part of this punch referred to as the movable part is displaceable in relation to the die while the material is being introduced into the mould cavity. This punch 4 is solidly connected to a pneumatic or hydraulic piston 5 which is slidable in a chamber 6 of a cylinder 7.

The lower end of the die 1 has an orifice for introducing the plastics material into the mould cavity which is closed by a laterally displaceable nozzle 8 having an inlet duct 9 for plastics material, held at the required temperature by means of a known control system, and supplied with plastics material in the customary way by a press (not illustrated).

This nozzle, by a gentle rubbing movement across the end face of the die 1, is displaceable between a position in which the duct 9 is concentric with the inlet orifice and a closing position wherein a cold surface 10 closes this orifice.

Figure 1:
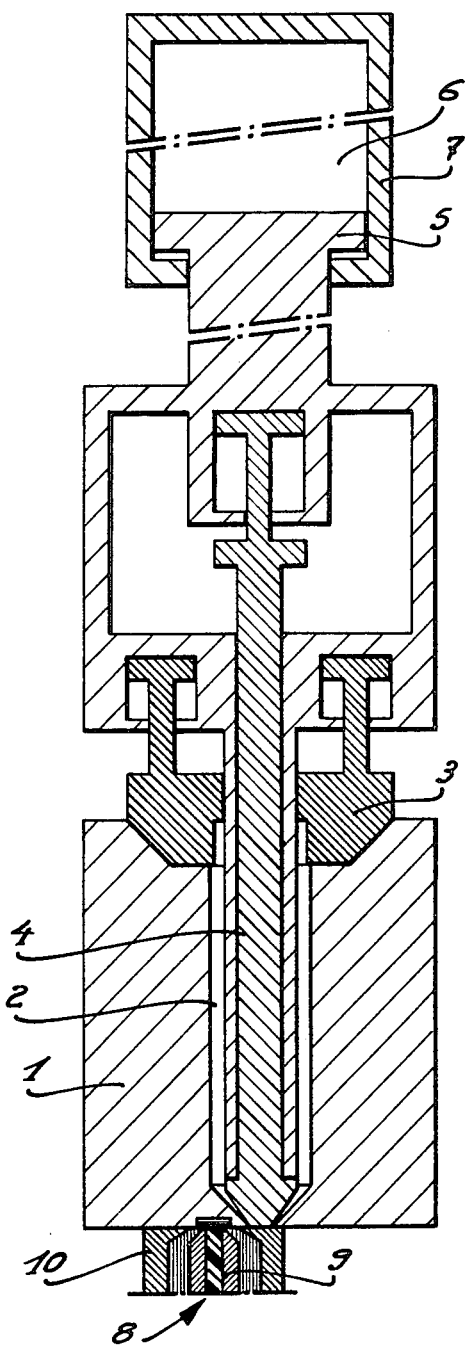

In the initial position, illustrated in FIG. 1, the punch 4 is fully introduced into the cavity 2 and closes the inlet orifice, the end face of the punch being in contact with the cold surface 10 of the nozzle.

Figure 2:
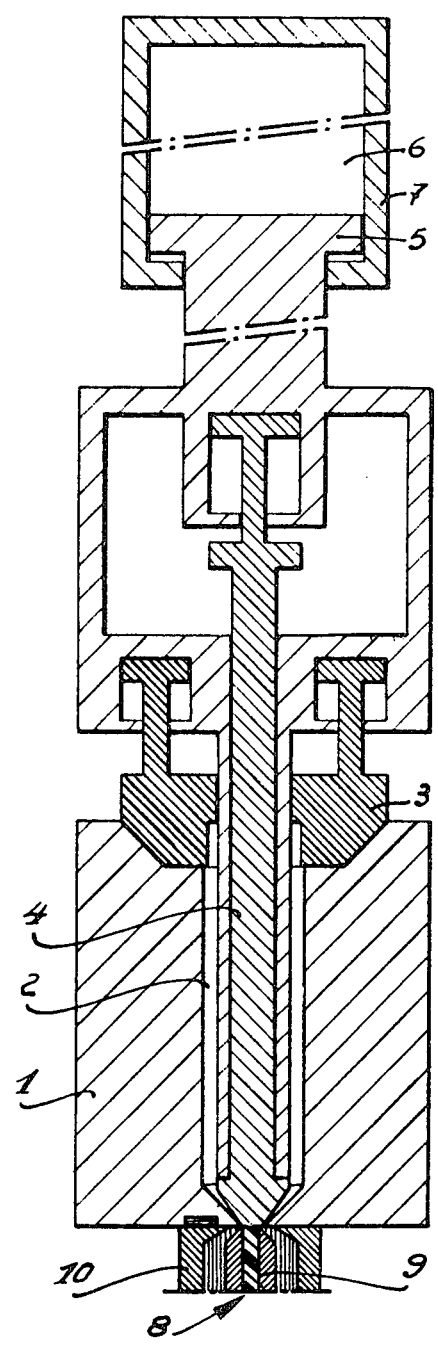

To produce an object, in particular a blank, the following operations are carried out:

1. The nozzle is displaced relatively to the die 1 to bring the inlet duct 9 for the plastics material into alignment with the inlet orifice (see FIG. 2). The punch 4 subjected to an adjustable restraining action by the piston 5, prevents the plastics material from freely penetrating into the cavity 2 and controls the flow of the material. This punch is subjected to a variable pre-settable restraining action which can be constant or programmed or may be a function of the factors relating to the material introduced into the cavity 2 (temperature, pressure, viscosity, internal cohesion etc.). The few millimeters of plastics material situated at the end of the nozzle are generally at a temperature slightly lower than that of the rest of the plastics material, the mould being colder than the nozzle 8.

By bringing this "cold plug" into contact with the end face of the punch it is caused to "stick" to the punch. This locates this portion of plastics material which, because of the repetitive nature of the manufacturing method and of the cooling of the material, will not have undergone the same heating history as the rest of the material used for producing the blank.

Thus in particular this "plug" of material is prevented from shifting and moving into an uncontrolled position in the blank where it is not required and where it would form a heterogeneous zone.

Figure 3:
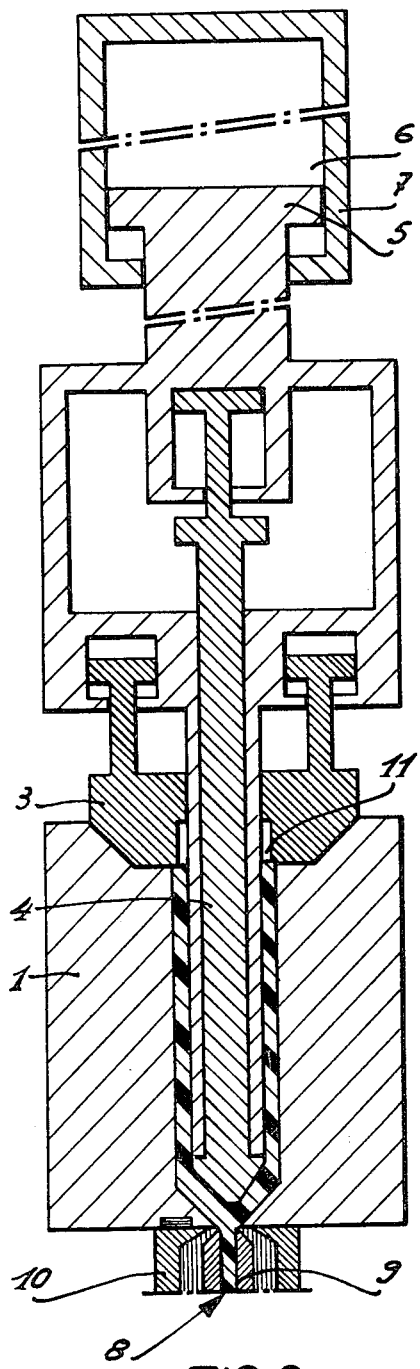
Figure 4:
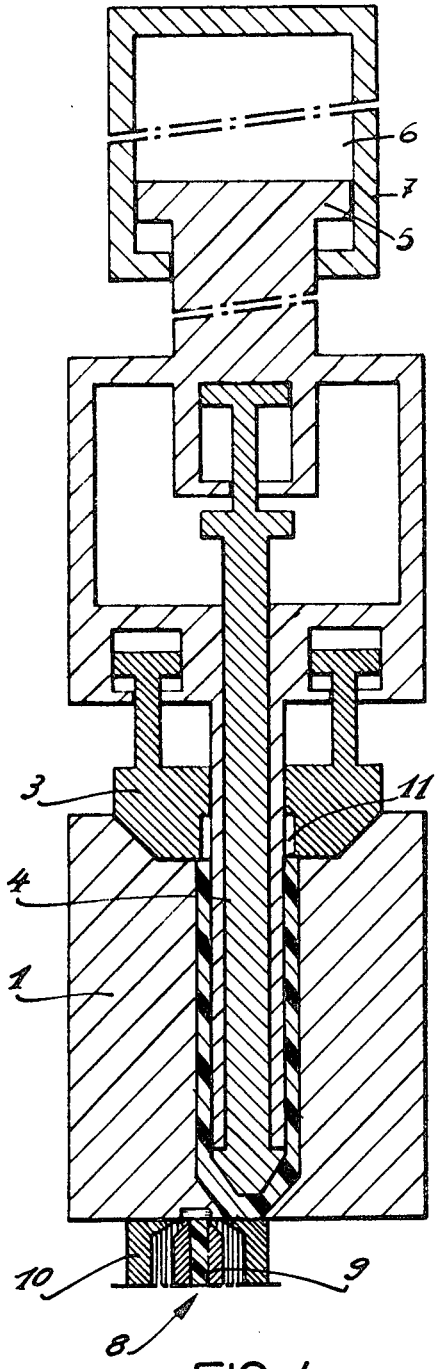

2. The plastics material is then forced by the press into the cavity 2 (see FIG. 3). Since the "plug" of material is fixed on the end face of the punch, the latter moves back under the pressure of the material which is greater than that of the restraining action of the punch, and the material flows evenly round the "plug" and gradually rises in the cavity 2 in a uniform manner without completely filling it.

While the material is being introduced in this way, it is not subjected to any compression or restraint and it flows freely around the punch 4 which, because of its restraining action, offers resistance to this flow of material and, by automatic balancing of its longitudinal position in the cavity, causes laminar flow of the material and controls the flow so as to achieve the greatest possible uniformity in the filling of the cavity.

3. The nozzle 8 is then displaced relatively to the die 1, and the cold surface 10 is brought into contact with the section of plastics material that has been sheared by this displacement.

4. The pressure of the material delivered by the nozzle 8 having been removed, the punch 4 then causes compression of the material trapped in the cavity 2 which is then completely filled. In this compression stage it is also possible to apply to the punch 4 a pressure that is greater than its restraining action. During this compression the "plug" of material is held between the cold surface 10 and the front face of the punch and cannot escape on either side so that complete uniformity of the object or blank is ensured (see FIG. 5).

Finally, the punch 4 is withdrawn from the cavity 2 and carries with it the object or blank 12. The latter may, at this stage, be sufficiently cooled to be dimensionally stable, or it may still be malleable. In the latter case it is possible to allow it to cool on the punch 4, which generally involves a retraction of the material. This retraction, controlled by the retraction of the punch, may be utilized for obtaining a blank with a thicker wall, provided a shorter blank can be accepted. This may be important in certain cases, since experience has shown that there are optimum thicknesses for the introduction of the material into the cavity 2. Thus, for the production of a thick-walled blank, it is nevertheless possible to introduce the material into the mould while taking into account this optimum thickness which is smaller, over a greater length, and to retract the punch to cause increase in the wall thickness of the blank (see FIG. 7). In this case the punch is free to move in relation to the closure member so as to enable this retraction to take place.

When it is required to produce objects having very thin walls, it is possible to carry out a mechanical stretching operation on the blank extracted from the cavity by the punch, the neck of the blank being held in the member that closes the die 3, and the punch being displaced relatively to the die. Finally, for the purpose of imparting particular properties or stresses to the material of the blank, the latter can be drawn, allowed to contract and then drawn again.

In a variation, not illustrated, it is also possible to introduce the punch, carrying the blank still in the malleable state, into a cold cavity and to compress the blank a second time therein in order to stabilize its dimensions.

When the required blank has been obtained, it can either be stored or be immediately used for forming an article, for example by introducing the punch, carrying the blank still at a forming temperature into a shaping or finishing mould.

Because of their uniform nature and their internal symmetrical stresses, the blanks obtained in this way can be shaped by any of the known processes to obtain a required article.

It is obvious that the method has been described by reference to a particular form of construction of the apparatus for carrying it out, but numerous modifications are possible.

The blank does not in fact need to be a hollow cylinder; it may be constituted by a hollow cone or even by a disc, and this will depend upon the shape of the cavity 2 and of the punch 4.

It will also be appreciated that use can be made of a nozzle other than the lateral-displacement type illustrated. To obtain the required results it is in fact sufficient to provide for the following:

1. Location of the "plug" of plastics material within the cavity of the die prior to the introduction of the plastics material into this cavity.

2. Introduction of the plastics material into the cavity of the die without subjecting it to pressure or restraint other than laminar flow around the "floating" punch, i.e. displacement relative to the cavity and against an adjustable pressure.

3. Compression of the plastics material in the cavity by the punch.

All the experiments so far carried out have in fact shown that the important stage in the process for obtaining a blank is the introduction of the material into the die cavity; this has to be carried out in a symmetrical and uniform manner and against a restraining action which is determined by the factors affecting the material used (pressure, temperature, viscosity etc.).

It should also be pointed out that the openings of the nozzle and of the cavity are large, i.e. several square millimeters, so that the cavity can be filled in a uniform manner with plastics material.

Ideal filling of the cavity is represented by uniform distribution of material around the "plug", which has been located symmetrically in relation to the cavity. This uniform distribution of the material results, by laminar flow between the walls of the mould and the surface of the punch in a gradient in the rate of flow of the material such that interior zones of the material enter the cavity in such a way that this material is kept away from the cavity walls and the surface of the punch by layers of plastics material already introduced into the cavity.

Figure 9:
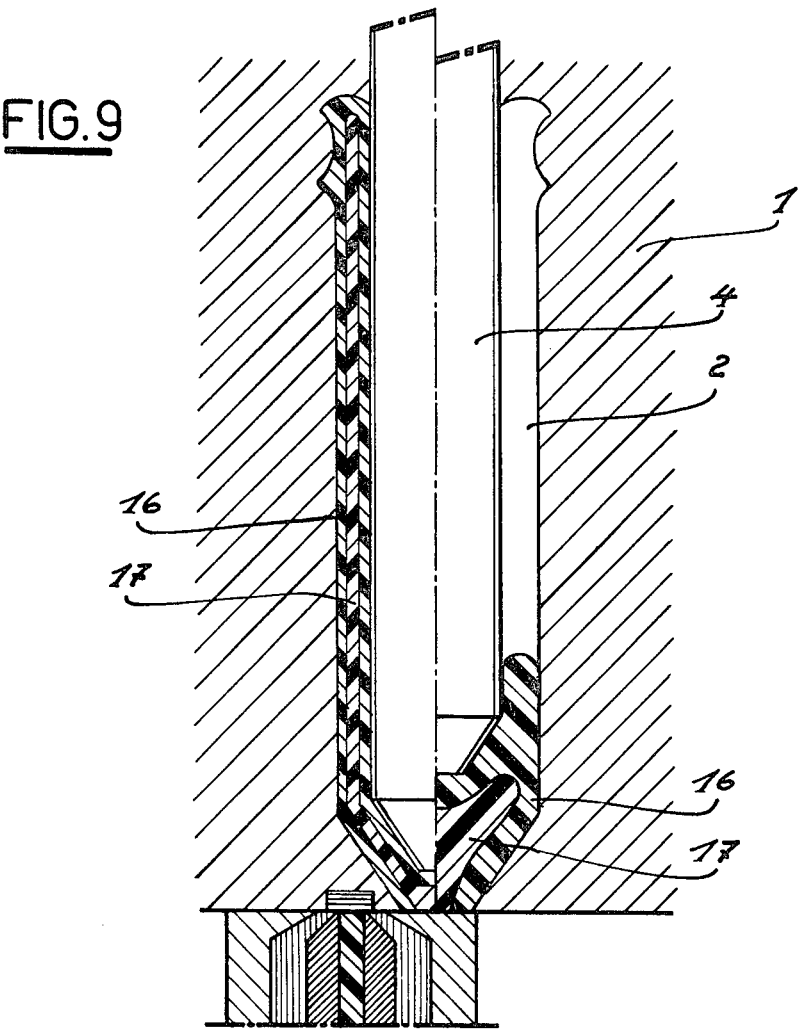
FIGS. 9 and 10 illustrate in section how the material is introduced into the mould cavity to produce an object having a composite wall.

This feature is exploited when it is required to produce blanks having composite walls (FIG. 9), that is to say blanks formed from two or more different plastics materials.

Then, in the manner described above, the cavity of a mould is filled with a quantity of plastics material formed by a first lot of a first material 16, but when the mould is partially filled, the nozzle in use is replaced by another nozzle by lateral displacement for example, and this other nozzle in turn introduces a second lot of another plastics material 17 into the cavity 2. This second plastics material 17 bears against the first material 16 which forms a sheath and is pushed away by the second material so that it is brought against the walls of the die 1 and the surface of the punch 4. The amount of the first material is so selected that when the cavity is completely filled said material forms a continuous skin, starting at the filling orifice of the die, which skin covers the walls of the cavity 2 and the surface of the punch 4, the second material 17 being encapsulated within this covering formed by the first material.

It is thus possible to obtain articles, of which the inner and outer walls are both of a material having particular properties, while the core, made of another material, provides other properties. At least one of the materials may incorporate an expanding agent to offset the contraction and to ensure good cohesion or adhesion of the core 17 within its protective skin. It is thus possible to obtain an object having a composite wall by using incompatible materials, since the bonding of the two components for the wall is not achieved by chemical means, but mechanically by encasing one material in the other.

Figure 10:
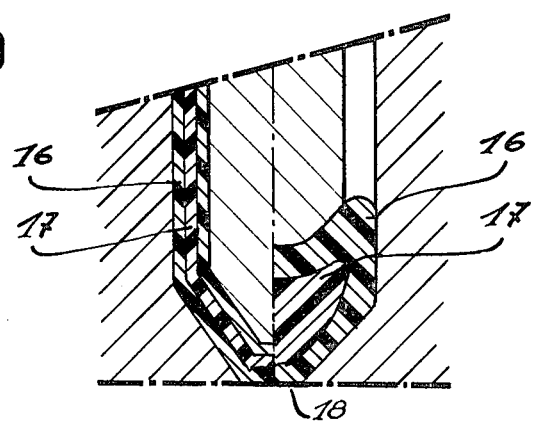

In order to enclose the second material completely within the first, a final small quantity 18 of the first material is introduced into the cavity 2 (see FIG. 10).

Figure 8:
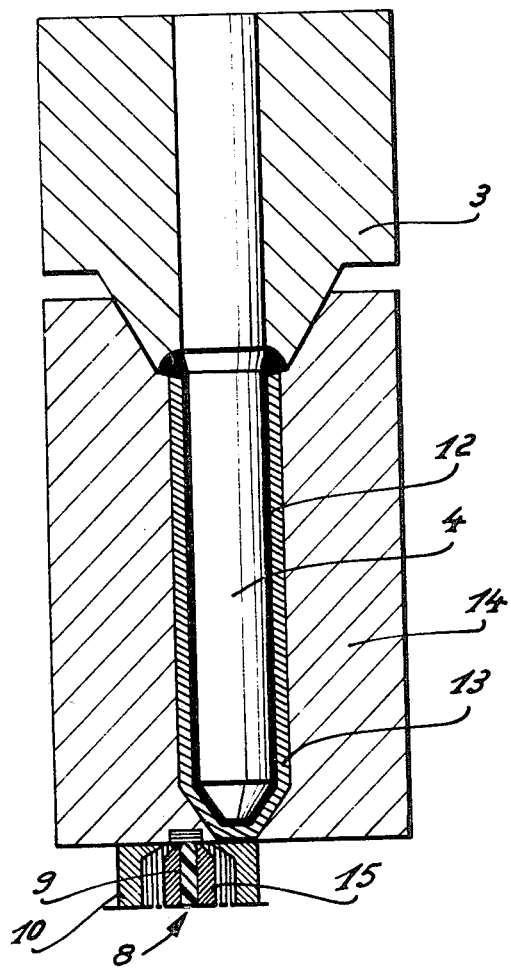
FIG. 8 illustrates how a blank having a composite wall may be produced.

Another method of producing composite blanks is illustrated in FIG. 8. A first blank is formed in the manner as described by reference to the drawing.

Then, this blank, after having hardened sufficiently, is covered with a second layer 13 in a second cavity 14 by means of a second nozzle 15 but in exactly the same manner as was used with the first nozzle. These operations can be repeated as required with a plurality of materials. This mode of operation is made possible by the low speed and the low pressure at which the material is introduced (large nozzle and large die openings), since no damage is thereby caused to the first layer of material, secured to the punch, when the second layer of material is being introduced.

A third method of obtaining a composite blank, intended to be formed into an article, consists in manufacturing two objects such as those obtained by the above-described method but having dimensions such that one can be fitted into the other. These two objects, which may be in different materials, incompatible or otherwise, are placed one within the other and the finished article is then formed.

Finally, again for the purpose of obtaining an article having a composite wall, it is possible, after having formed a blank in the manner described above, to remove the blank from the die by leaving it mounted on the punch, and then to apply a fine layer of some other plastics material to the object by dipping or some other coating method.

To achieve better distribution of stresses in the blank, the punch and the die can be rotated relatively to each other during the entire period in which the material is being introduced into the cavity.

One of the main advantages of the method described consists of its ability to provide blanks which, because of the absence of internal stresses or because the stresses are controlled, are capable of being shaped by any known process.

A further advantage of this method consists in the fact that there is no wastage of plastics material, the entire amount of plastics material introduced into the mould cavity being used for forming the required object. This is particularly important in the case of articles made of two materials since here the separate recovery of the materials is impossible in practice.

The installation or apparatus for carrying out the method described has an important basic characteristic. The punch 4 is only displaceable axially. This enables it to be centered very accurately. All the lateral movements required in the operating cycle, in transferring the blank to a shaping cavity etc. are always achieved by lateral displacement of dies, inlet nozzles, plasticizer if required and the shaping cavities, if the punch enables the articles to be shaped by blowing.

This conception of an installation for the hot-shaping of a blank and/or of a finished article is original and greatly simplifies the mechaninal problems involved in such an installation. Everything hinges upon a punch which is displaceable linearly only along the line of its own axis. The dies, nozzles and shaping cavities can be indexed and brought in turn into alignment with the punch in sequences required by the desired manufacturing cycle.

The present invention also concerns an article of plastics material obtained by this method when a quantity of plastics material consisting of two lots of separate or different materials is introduced into the mould cavity. This article is characterized in that one of the plastics materials forming the composite article is almost entirely encased in the other material. One of the materials used may even be completely contained in the other when use is made of a third lot of material that is identical to the first as shown in FIG. 10.

In the apparatus described, the orifice for introducing the plastics material is formed at the base of the die. This position of the orifice in the mould may be varied, and in particular the plastics material may be introduced through the punch.

Having described the method and the apparatus for the manufacture of plastics material articles, it will now be of interest to point out some particularly important features for the optimum manufacture of articles by this method.

As seen before, one of the difficult problems is the homogeneous introduction of the material through the nozzle into the space comprised between the walls of the die cavity and of the punch. An other difficulty resides in keeping the concentricity between the punch and the mould during the intrusion of the material.

Figure 11:
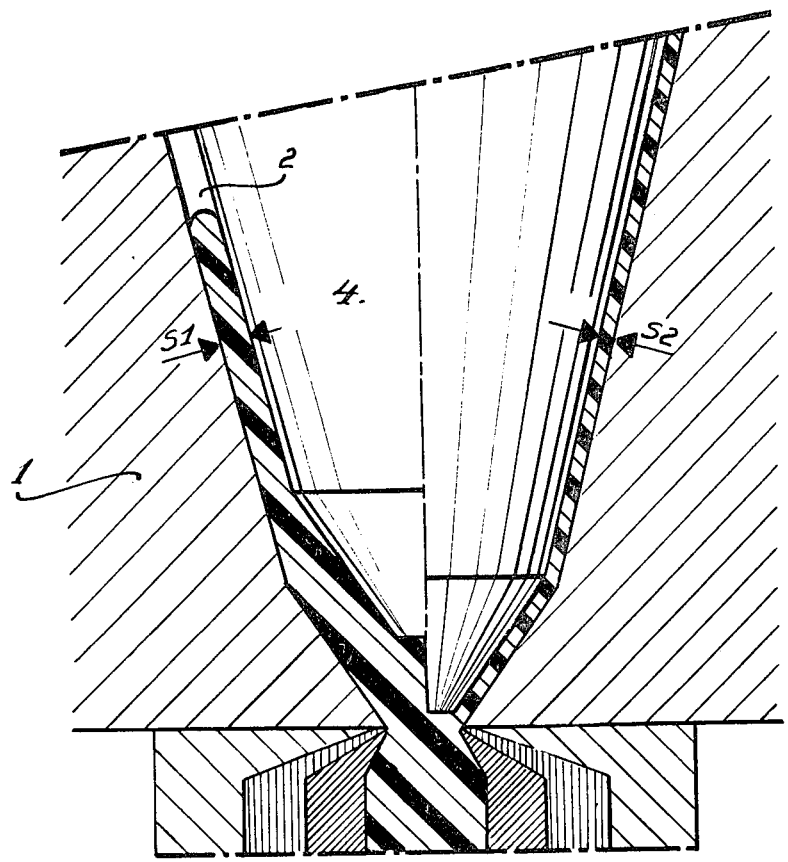
FIG. 11 shows a conical punch working in a conical die, the left portion of the figure showing the introduction of plastics material and the right portion the compression of said material.

In using a mold 1 having a conical cavity 2 (FIG. 11) and a punch 4 also conical, we may vary the thickness of the plastic material between the time of its intrusion (left side of FIG. 11) and the time of its compression (right side of FIG. 11). During the intrusion of plastics material into the cavity 2, the distance separating the punch 4 from the die is relatively great, enabling an easy flow, under low pressure and with a low lamination rate of the material. This reduction of the intrusion pressure permits simultaneously the obtention of a more homogeneous mass of material and a very important reduction of the mechanical stresses applied to the punch 4. The reduction of these stresses helps to maintain the concentricity of the punch with respect to the die as well during the material intrusion as during its compression.

Figure 12:
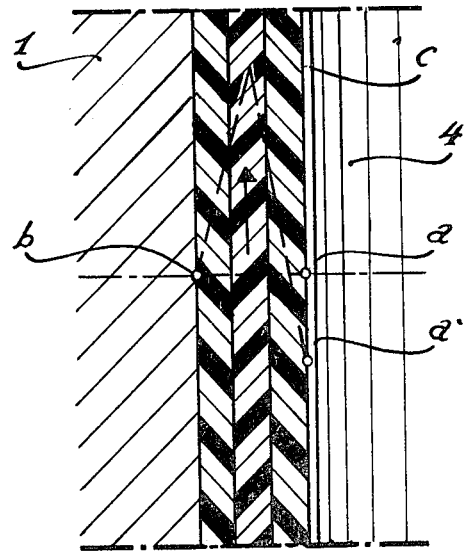
FIG. 12 shows the movements within the material during compression of the blank.

One knows that according to the plastics materials used, the orientation of the material in the cross section of the article may determine its mechanical properties. Through the described method, one obtains a first orientation of the material during its intrusion between the punch and the mould. In fact, (FIG. 12), as the material is introduced within itself, the particles of material located either in the vicinity of the punch a or of the wall cavity b, tend to remain behind with respect to a particle of material c located at the center of the wall of the blank despite the fact that all these particles where located in the nozzle in a same cross section of the material. A stretching in thus obtained within the material causing an orientation of its particles during the intrusion phase. Then, this orientation of the material is further accentuated during the compression phase. As a matter of fact, the particle a of material located against the punch is displaced to a' by means of the relative displacement of the punch and of the mould during the compression.

The tests made show that this phenomenon of orientation could be the cause in enhancing the mechanical properties of articles made according to this method.

A critical point for the realization of the installation to carry out the method is the realization of the intrusion nozzle. In fact, the material has to remain in the nozzle at a temperature which is higher than that of the mould.

Figure 13:
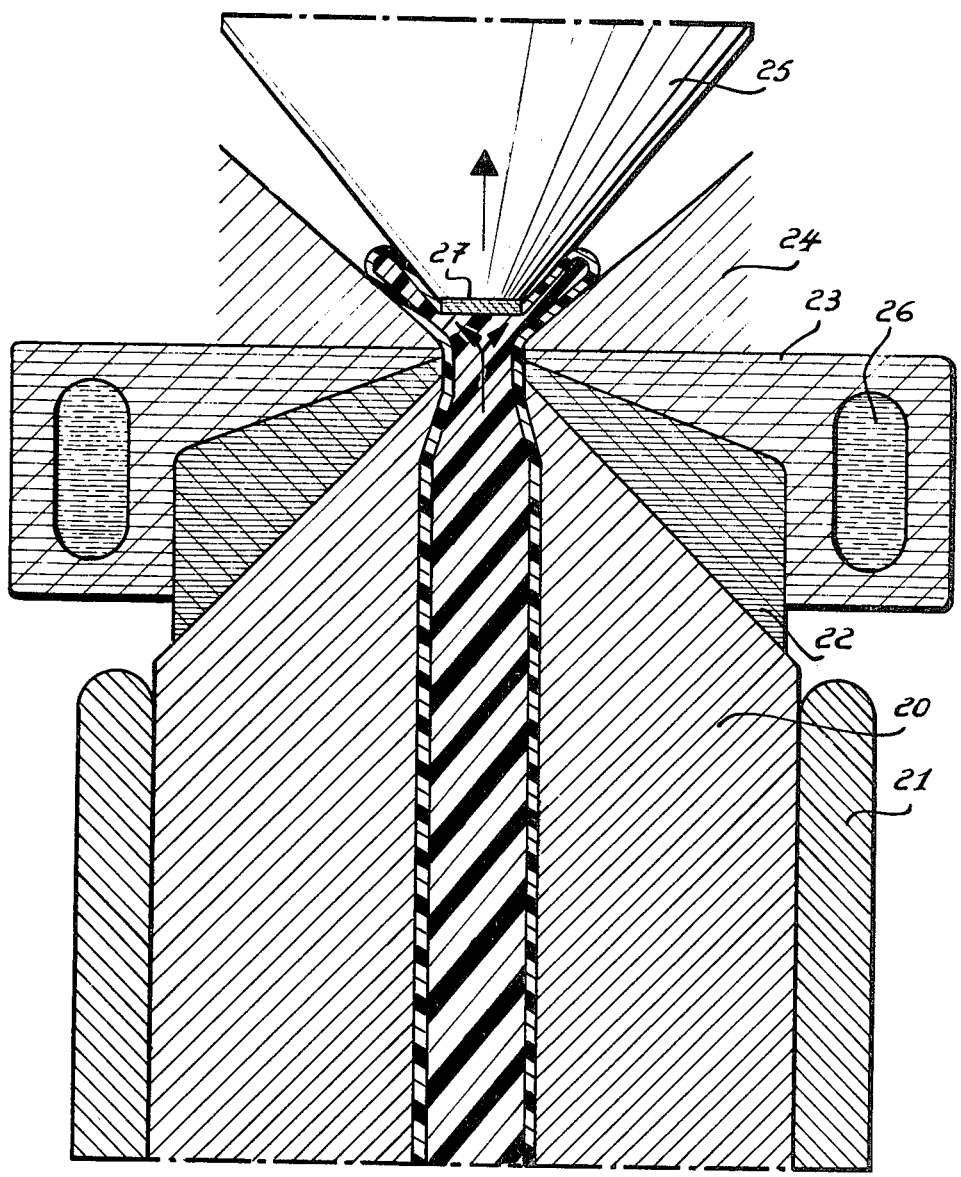
FIG. 13 shows a detail of the intrusion nozzle.

FIG. 13 shows a particular nozzle which comprises a body 20 having a temperature stabilizing circuit 21. This body 20 terminates in a conical portion surrounded by a cone 22 made of insulating material, separating this body from a cap 23 the upper surface of which rest against the mould 24. This cap 23 comprises also a temperature stabilizing circuit 26 as well as the mould 24 and the punch 25. Generally the temperature of the cap 23 is maintained at the same value as the temperature of the mould 24.

In that way the plastic material is maintained up to the forward end of the nozzle at the temperature of the nozzle body. The critical zone for the formation of the plug 27 of "cold" material is then kept as small as possible.

Furthermore, in order to place the plug 27 against the frontal face of the punch during the intrusion, it is necessary that the opening of the mould and the aperture of the nozzle have about equal dimensions and that the shape of the cavity in that region be such that even under the shearing effect due to the lateral displacement of the nozzle for closing the die, this plug does not escape laterally between the cavity and the punch, even partially.

To avoid the formation of a plug of "cold" material, one may, after having closed the nozzle, cause a decompression of the material, separating this material from the lower surface of the mould which obturates the nozzle. This decompression may be obtained by an axial withdrawal of the plastification screw.

FIGS. 14, 14a, 14b and 14c show schematically a modification of the method enabling the production of articles having a bi-axial orientation of the material.

The 30 is made as hereinbefore described, then the punch is axially retracted out of the mould, taking the blank 30 with it. The punch is made, as in the preceding embodiments, in two parts sliding the one 31 within the other 32, providing between them a free space 33. This space 33 is connected by a duct 34, a first value 35, a container 36 and a second valve 37, to a pressurized air supply.

During the formation of the blank the container 36 is filled with a determined quantity of air, the valve 37 being open and the valve 35 closed. The desired air quantity being in the container, the valve 37 is closed. Immediately after the withdrawal of the punch outside of the mould, the valve 35 is opened and the blank is inflated (FIG. 14b) in the ambiant air. The material is sufficiently homogeneous for this inflating to be symmetrical. Then (FIG. 14c), the inside part 31 of the punch is downwardly displaced causing a mechanical streching of the blank. This inflated and mechanically streatched blank is then placed in a finishing mould by means of an axial displacement of the punch and blown into its definitive shape by means of opening the two valves 35,37.

Another feature of the installation for carrying out the method is that the punch moves only axially along its longitudinal axis. The die and finishing mould are displaced laterally to be centered successively with the punch. Therefore the axial stroke of the punch is reduced to a value slightly greater than the height of one mold consequence, the installation is easier to manufacture, the centering of the punch is easy, the stresses are less and the machine is stronger.

FIGS. 15, 15' show a practical realization of the device to carry out the method. (FIG. 15' shows the upper part of the device).

This installation comprises a table 40 on which rests a nozzle closing device. This device comprises a support 41, at least one part of which 42 is maintained at the same temperature as the mould for the blank 43. A temperature stabilizing circuit 44 is provided therefor. In this embodiment, the part 42 forms simultaneously a portion of the mould. In fact, when the mould 43 is centered on the support 41, the cavity 45 of the mould 43 for the blank is terminated by the housing 46 of the part 42.

A nozzle is fixed under the table 40 which is fed with plastics material by means of a press not shown. This nozzle 47 has a large apperture and its body 48 is maintained at a temperature corresponding to the temperature of the fused plastic material by means of a temperature stabilizing circuit. This temperature is higher than that of the mould 43 which is also stabilized as to temperature by means of a circuit 49. This nozzle has a cap 50 thermally insulated from the body 48 by means of an insulating material 51 so that this cap is always at the same temperature as the part 42 of the support and thus of the mould.

The mould is laterally displaceable and can be replaced by a finishing or blowing up mould 52 (right part of FIG. 15), when the punch 53 is in its upper position.

The installation comprises two bridges 54,55, fixed the one with respect to the other but displaceable axially together with respect to the table 40. The bridge 54 carries an upper centering device 56 for the mould 43 or 52. This upper assembly 56 comprises the portion of the mould 57 constituting the neck of the plastics material article and a guiding block 58 for the punch 53. Hydraulic jacks, not shown, control the axial displacements of the bridges. It is evident that this upper assembly 56 has also a temperature stabilizing circuit 59.

The punch 53 comprises an internal sliding part 60 forming its lower end; the whole being temperature stabilized by a circuit 61. The whole punch is carried by the upper bridge 55 and is displaceable with respect to said bridge. A piston 62 fast with the punch 53 slides in a cylinder fast on the bridge 55. A hydraulic control circuit 64 controls the displacements of the punch 53 with respect to the bridge 55 and its position within the cavity 52.

When the blank mould is closed by the movement of the bridge 54 and the punch is located in this mould in the material intrusion position, it is possible thereafter to cause compression of said material by mean of the control circuit 64 causing a subsequent lowering of the punch up to its position shown in the left part of FIG. 15.

A second control circuit 64 is provided to displace the frontal portion 60 of the punch and air is blown through an opening 66 between this portion 60 and the punch 53 to inflate the article within the finishing mould 52 or to stretch the blank.

The height over which the bridges 54, 55 and the punch displaces is slightly greater than the height of the mould 43 or 52. A reduced stroke permits a good centering and a high rigidity of the whole installation. This is obtained due to the fact that the moulds 43 and 52 are laterally removable. Their centering in working position is precise and easy to obtain, they are pressed between the support 41 and the centering assembly 56. Conical rest surfaces can be provided to improve the centering.

It is to be noted that the use of a shearing nozzle which enables separating completely the hot nozzle from the blank, which is maintained against a cold surface during the compression phase, is particularly advantageous for working with thermoplastic polyesters. One avoids therewith a crystallization of the material which preferably appears for the hot zones.

It is evident that the method described with respect to an installation in which the punch has only axial displacements could be performed by mean of an installation where the punch would be displaceable also laterally to be bought into register with fixed moulds.

FIG. 16 shows partially one embodiment of an installation in which the punch 53 is manufactured in one piece. This punch comprises a blowing groove 67. This punch 53 is axially displaceable with respect to the guiding block 58 or to the ring 57. During the introduction of material and its subsequent compression, the punch is in the position shown in the left half of the FIG. 16; the blowing groove 67 is closed.

When the punch is in blowing up position, for blowing up the blank in a finishing mould it is in the position shown in the right half of FIG. 16; the blowing groove 67 is fixed and air is distributed through ducts (not shown), provided in the guiding blocks 58, to said groove to blow up the blank. This punch can also comprise similar grooves (not shown) for the filling of the article formed by a liquid.

We claim:

1. A method of producing an object made of plastic material in a mold in which the material is introduced into the space between a punch and a die surrounding said punch through the open end of said die, which can be connected to a device for the supply of plastic material under pressure, said punch and die comprising said mold, the method comprising the steps of:
    (1) connecting a supply of hot plastic material, at a temperature higher than the temperature of the mold, with said open end whilst the front part of the punch is positioned in said open end, in order to close said open end to restrain the introduction of hot plastic material with low viscosity, into the empty space surrounding the punch within the die, (2) progressively withdrawing the punch to progressively increase the flow section of the hot plastic material into the space between punch and die, whilst simultaneously progressively filling said space with plastic material of increased viscosity due to the cooling by the punch and die until the front part of the punch reaches a position of maximum distance from the open end with maximum flow section for the plastic material, (3) subjecting the punch to a preset restraining action such that its longitudinal position is automatically balanced and it offers resistance to the flow of material in such a way as to control the introduction of material to achieve laminar flow, uniform filling, and symmetrical distribution of residual stresses, (4) disconnecting the connection between said plastic material supply device and said open end, and then (5) compressing the cooled-down plastic material contained in the space between punch and die, by progressively reducing the distance between the front part of the punch and the said open end of the mold.

2. A method according to claim 1, in which when said plastic material completely fills said space, said free end of the punch is still spaced from said previously open end of said die.

3. A method according to claim 1 for producing articles having composite walls, characterized in that the punch, carrying a first object, is introduced into the die and a second object is formed on the first by the method set forth in claim 1.

4. A method according to claim 1 characterized in that the quantity of plastic material introduced into the die consists of at least two lots of separate materials introduced in turn into this die.

5. A method according to claim 4 in which the two lots of plastic material consist of different plastic materials.

6. A method according to claim 4 in which at least one of the lots of plastic material contains an expanding agent.

7. A method according to claim 1, characterized in that the punch is displaced axially and angularly about its longitudinal axis in relation to the die.

8. A method according to claim 1, characterized in that the punch carrying the object is extracted from the die and that the object covering the punch is stretched.

9. A method according to claim 1, characterized in that the punch carrying the object is extracted from the die and that the punch is reduced in length thereby allowing the object covering the punch to contract.

10. A method according to claim 1, and extracting said punch covered by the object from said die and blow molding the said object into its final shape by causing said punch to cooperate with finishing dies.

11. A method of producing an object made of plastic material in a mold comprised by a hollow die having an open end for the reception of plastic material, in which a punch having a free end and having its exterior spaced inwardly from the interior of the die is positioned for reciprocation in the die toward and away from said open end to close and open said open end, respectively, the method comprising the steps of positioning said punch in said die with said free end of said punch closing said open end of said die, positioning a nozzle in sliding contact with the mold with the nozzle out of registry with the hollow die and the mold closing the nozzle, supplying said plastic material to the nozzle at a temperature higher than the temperature of the mold whereby said plastic material in the end of the nozzle is cooled by the mold and forms a relatively cold plug in the end of the nozzle, sliding the nozzle and the mold relative to each other until the nozzle is in registry with the die and said plug sticks to the free end of the punch, moving said punch backward away from said open end to open said open end and progressively increase the flow passage between the die and the punch while simultaneously maintaining said free end of said punch in contact with said plastic material and introducing said plastic material in a moldable state through said open end into said die around said plug and punch in a quantity sufficient to at least partially fill the space between said die and said punch, closing said open end of said die by sliding the nozzle and mold relative to each other back to a position in which the nozzle and die are out of registry with each other and the mold closes the nozzle thereby to form a further relatively cold plug in the end of the nozzle by heat exchange with the mold, which further plug is subsequently moved into contact with the free end of the punch during the formation of a subsequent said object, and advancing said punch toward the previously open end of the die to compress said plastic material into the space between said die and said punch.

* * * * *